March 10, 1964   L. H. COOK   3,124,612
UREA CRYSTALLIZATION
Filed June 13, 1962
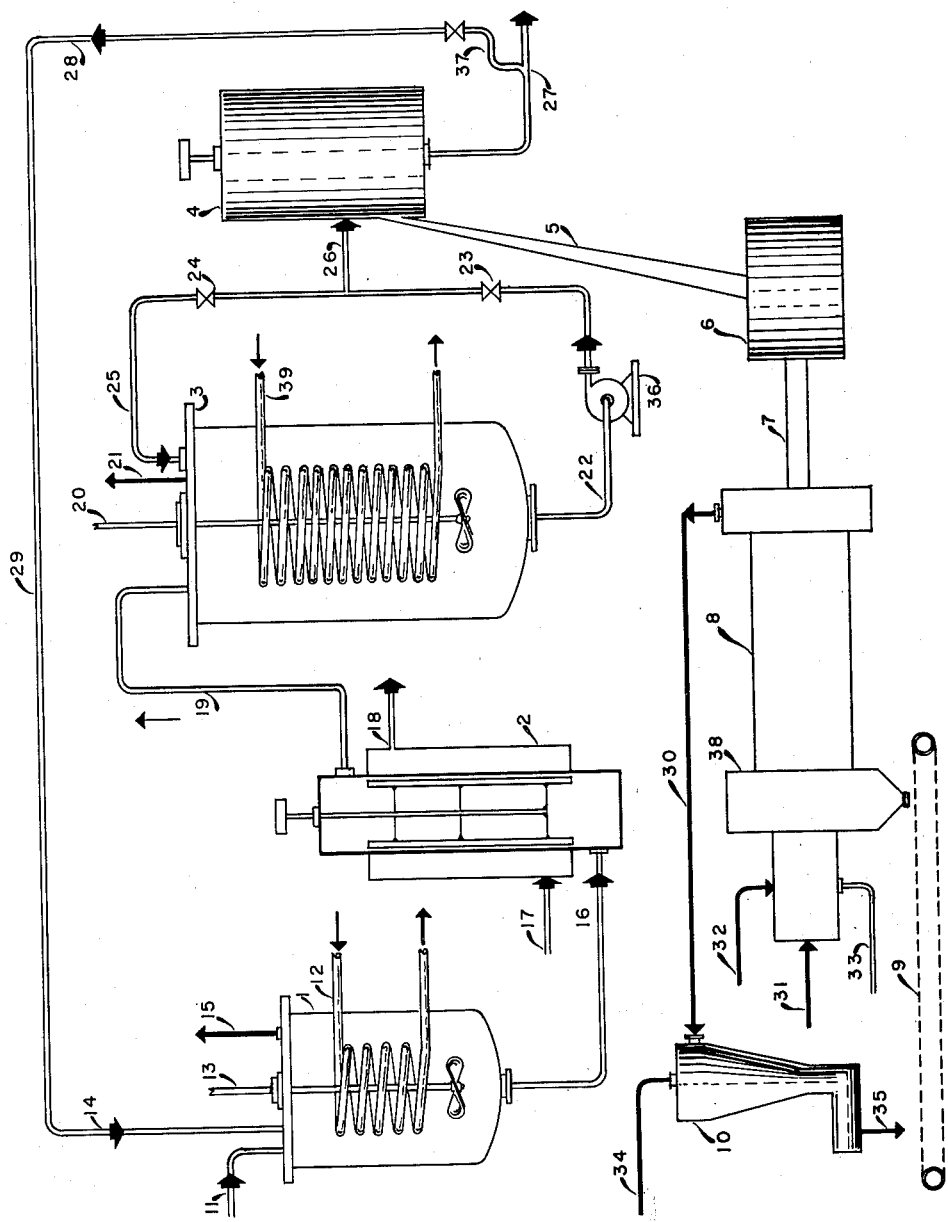
L.H.Cook
INVENTOR.
BY  J. W. McCloskey
AGENT.

United States Patent Office 3,124,612
Patented Mar. 10, 1964

3,124,612
UREA CRYSTALLIZATION
Lucien H. Cook, Port Washington, N.Y., assignor to Chemical Construction Corporation, New York, N.Y., a corporation of Delaware
Filed June 13, 1962, Ser. No. 205,160
4 Claims. (Cl. 260—555)

This invention relates to a method of crystallizing urea and is particularly concerned with the method of crystallizing urea from concentrated solution to recover a crystal product which is essentially free of biuret.

The process of this invention is applicable to the production of urea crystals from any urea solution containing biuret. However, the process is particularly adaptable to recovery of urea crystals having a low biuret content from urea solutions obtained by the reaction between ammonia and carbon dioxide at high temperatures and pressures. Generally, the urea solution produced by these processes contains about 0.3–1.0% of biuret. However, the biuret content in the solidified urea product has been known in some instances to reach the extremely high figure of 16%.

Generally, very little biuret is formed during the synthesis of urea in conventional processes employing high pressures and temperatures because the excess ammonia present during synthesis prevents formation of biuret. However, during subsequent steps of removing the excess ammonia and decomposition of carbamate into the component gases the protective influence of ammonia is not present under pressure to prevent the formation of additional biuret in the system. Consequently, there is a tendency for the urea to decompose into ammonia and biuret, particularly at temperatures of 220° F. such as disclosed in the U.S. Patent No. 2,701,262. The method of preparing urea solutions for prilling operations also is a factor in increasing the biuret content of the final urea product, since the urea solution derived from the synthesis is evaporated to concentrations containing 90% urea or higher. The heating of urea during concentration promotes the formation of more biuret. Even in conventional processes of crystallizing urea the biuret content may be increased by the recirculation of large quantities of mother liquors which allows the biuret content to build up in solutions and facilitate the occlusion of this decomposition product in the final urea crystal. In any case, heating urea to high temperatures to effect evaporation of water or holding urea solutions at temperatures above 212° F. for appreciable periods results in a urea product containing objectionable concentration of biuret.

The urea of such high biuret content has been found unsuitable for a number of uses. The U.S. Department of Agriculture recommends that for general use as a fertilizer for heavy crop cultivation the urea should not contain more than 2% biuret. During recent years considerable urea has been used as a foliar spray to permit feeding of plants through the leaves as well as a substitute for conventional feeding through the root system. In this application of urea authorities recommend that the biuret content should not exceed 0.25%. A further demand for a low biuret content urea comes from the plastics industry. Here rigid specifications have been set up for the urea used in molding resins because the biuret tends to cause turbidity of the resulting plastics. For plastic use, the biuret content of the urea should not be over 0.2%.

In normal practice the urea produced by the processes referred to above is evaporated to reduce the water content down to 10% or less. This concentrated solution is then pumped to prilling towers where streams of said solution are sprayed or jetted into the tower to allow the droplets of liquid to fall through an ascending column of air. During travel through the airspace enough water evaporates to cause the urea to solidify. The solidified particles of urea are then subjected to heat in kilns to drive off additional amounts of water. As pointed out above, these prills would contain too much biuret to be satisfactory as an agricultural spray, as a fertilizer in some instances or as a raw matetrial for urea formaldehyde resins.

In the past, low biuret urea has been obtained by redissolving the urea prills and recrystallizing the urea. To obtain exceptionally pure area in conventional crystallizing processes it was necessary to recrystallize more than once to eliminate essentially all the biuret. One of the prior processes used for recovering a biuret-free urea employed a biuret-free urea solution, preferably a saturated solution as a washing solution to remove biuret from solidified or crystallized urea. These processes are considerably involved in that they first require the recovery of a solidified urea product and are followed by a crystallizing step or a washing step. The latter case referred to above also requires the preparation of a urea solution which is free of biuret. This would complicate a commercial procedure which produces urea solutions having about 0.3–1.0% biuret.

It is the object of this invention to produce urea which is essentially free of biuret. It is also a further object of this invention to reduce the biuret content in urea to percentages which would fall below the maximum amount permitted for plastics and foliar grade urea. A further object is to produce crystallized biuret-free urea by a more simplified process than has heretofore been employed.

Other objects will become apparent from the following description of the invention, and the advantages not specifically referred to will be apparent to those skilled in the art.

In the method of this invention the hot solution containing urea having an unduly high biuret content is cooled to temperatures or maintained at temperatures at which the crystalline urea will not form. Thereafter the hot solution is quickly cooled in a heat exchange zone to a temperature which permits fine crystals of urea to form. The maximum amount of urea which is allowed to crystallize from solution during passage of the urea solution through the heat exchange zone corresponds to about a 27% slurry by weight of urea crystals in the urea solution. These crystals are removed from the cooling zone and allowed to remain in contact with the mother liquor at a substantially constant temperature as a slurry for a period of from ½ to 2 hours to permit the fine urea crystals to grow to an extent that the crystals are readily removed from solution by subsequent separation steps. If a higher yield of urea from the feed stream is desired while still maintaining a maximum of 27% by weight slurry, a portion of the mother liquor recovered after crystal separation must be recycled and mixed with fresh incoming urea solution prior to passage through the heat exchange zone. While practically all of the urea could be removed as crystal from the original urea solution, it has been found that to preserve the benefits derived from this invention; namely, a crystal product having an extremely low biuret content, mother liquor should not be recycled in amounts which would yield more than 50% by weight of crystal from the original urea solution. The crystals on separation from solution are dried according to conventional practice and packaged for shipment. It has been found that by following these steps the biuret content of the urea falls below that amount which has been recognized as unsuitable for use either in the practice of spraying on plant foliage or in the plastics industry. The remainder of the urea in solution is thereafter concentrated and can be prilled by conventional methods. One such method is illustrated in U.S. Patent No. 2,774,660.

The invention will be more easily understood by reference to the accompanying drawing which is a schematic diagram of the preferred embodiment of the arrangement of apparatus for practice of the applicant's invention.

Referring now to the drawing, the urea solution containing biuret is delivered through line 11 to a tank 1 where the solution is maintained at a temperature which prevents the crystallization of any urea. The temperature depends upon the amount of urea in the solution; higher concentrations of urea requiring higher temperatures. Where cool solutions returning through line 14 are to be mixed with the hot solutions entering through the line 11, the temperature is adjusted by means of the heating coil 12 through which flows a heating medium such as steam. If the solution entering vessel 1 is too hot the coil 12 can be converted to a cooling coil by substituting water for steam. If any excess ammonia present in the solution is liberated in vessel 1, said ammonia gas will be vented through the line 15. To maintain an equal temperature throughout the solution, the vessel 1 is provided with an agitator 13.

The next step in the process, and one of the more significant features of this invention, is the quick cooling of the urea solution as it comes into a crystallizer 2 from the vessel 1 through the line 16. Any suitable heat exchange zone which creates a rapid chilling of the urea solution with deposition of urea crystals on a surface and provides a means for scraping the surface in the heat exchange zone to remove urea crystals deposited thereon, will be suitable for the practice of this invention. One of the more desirable devices is that similar to the Votator, such as described on page 1213 of Perry's Chemical Engineers' Handbook, 3rd edition. In these types of devices the solutions are rapidly chilled to temperatures which promote the formation of finely divided urea crystals along the walls of the vessel—said vessel being provided with a cooling jacket and means for ingress (17) and egress (18) of a cooling medium. Paddles or scraping blades are provided to remove the crystals as they form on the inner surface of the heat exchanger. The crystals are then rapidly removed from the Votator through the line 19. Since the size of the Votator is such that the flow of solution through the vessel is quite rapid, only the very finest of crystals will be permitted to form since there is not sufficient time to allow for growth of crystals.

While the above apparatus described in Perry's Handbook is referred to hereinafter in the description of the invention, it is to be understood that any equivalent means may be substituted for the Votator provided the retention time of the crystals on a chilled surface is less than one second. The chief criterion is that microscopic crystals be induced to form rapidly and at the same time little or no biuret be occluded in the urea crystals.

The solution flowing from the Votator is delivered to a large holding tank 3 of such capacity that the crystals will remain in the tank for a period of from ½ to 2 hours. In this tank the temperature is maintained by means of a coil 39 at approximately the temperature at which the solution enters said tank. Generally, steam or some other heating medium is permitted to circulate through the coil to maintain the temperature. The crystals which are now growing at the expense of other crystals are kept in suspension by means of a stirring device 20. Any gases liberated from the solution during this step are vented through the line 21. After the crystals have been held in the tank for the time indicated above, the slurry is withdrawn from the bottom of said tank through the line 22 and pumped by pump 36 to a separatory means for segregating the urea crystals from the mother liquor.

If expedient, the volume of slurry delivered to the separatory means can be controlled by allowing some of the solution from the bottom of the tank to recirculate to the upper part of the tank through the line 25. The means for controlling the flow of liquor, plus urea crystals, through the line 25 and through the line 26 to the separator is controlled by valves 23 and 24.

A portion of the slurry is sent to the separatory means 4 to be divided into its liquid and solid components. The preferred device for separating the crystals from the solution is a centrifugal device as diagrammatically shown in the accompanying drawing. While a centrifugal filter is shown on the drawing and is preferred for quick separation of crystals and liquor, other types of filter means could be substituted for the centrifuge illustrated.

The solution flows from the bottom of the separatory means through the line 27 where it may be divided to allow a portion of the liquor to flow back to the tank 1 through the lines 23, 29 and 14. As will be pointed out below, a return of the portion of the filtrate from the centrifuge 4 is necessary to increase the removal of urea if a higher yield from the feed stock is desired.

The solid material coming off the side of the centrifugal device 4 falls through the chute 5 into a hopper 6. From this hopper moist urea crystals are delivered to a drying kiln 8 by means of a screw conveyor 7. This kiln can be heated by any means, but the preferred operation is as shown in the flow diagram which indicates the flow of air through the line 31 into the heating end of the kiln where the temperature of the air is increased by coming into indirect contact with steam. Condensate is removed by line 33. As the moist urea crystals move forwardly through the kiln 8 the water content is removed by the thus heated air. At the discharge end of kiln the dried urea crystals are collected into a hopper device 38 which is provided with a conical shaped bottom structure which facilitates the withdrawal of urea onto a moving belt conveyor 9. During drying, the flow of air through the kiln 8 carried with it some finely divided particles which are separated by a cyclone 10. The finely divided urea is delivered onto the belt conveyor 9 through the line 35 while the thus scrubbed air is removed through the line 34. In the above operation due care should be taken not to overheat the urea crystals to prevent decomposition of urea and thereby offsetting the advantages of the improved crystallization technique. It is preferred that temperatures of the urea should not be greater than 225° F. during this drying step.

The solution delivered to the temperature adjustment tank 1 may be treated prior to being pumped through line 11. It has been found desirable to purify the urea solution after removal of excess ammonia and decomposition of ammonium carbamate followed by removal of component gases ammonia and carbon dioxide by adding carbon particles to the solution, aerating and filtering the carbon with occluded impurities. During the time the urea solution is being mixed with the carbon particles and aerated, the gaseous impurities occluded in the solution are also removed with the air being vented from the purification tank. After the carbon has been intimately mixed with the urea solution and said solution has been sufficiently aerated, the carbon slurry is pumped to a filter where the carbon, plus occluded impurities thereto, are removed. A leaf type filter is preferred for this operation. However, other types such as rotary filters could be used. As a result of this operation the urea solution is clarified to the extent that practically all the solid substances which cause turbidity and colorizing substances are removed before the product urea is crystallized. The temperatures employed during this operation are in the range of approximately 150–212° F. depending upon the amount of urea in solution. Clarification at temperatures substantially below 150° F. would favor crystallization of urea and must be avoided; while crystallization at temperatures substantially above 212° F. would increase the biuret content of the solution which is also undesirable.

After clarification the purified urea solution is delivered to the temperature adjustment tank 1. This purified solution has a temperature within the range of about 150°–212° F. but the solution returning to the tank 1 through line 14 has a somewhat lower temperature due to the subsequent cooling operation required to cause crystal formation in crystallizer 2. This recycle of a portion of the filtrate from the centrifuge is returned to the temperature adjustment tank when it is desired that an increased amount of urea be recovered as crystals from the original urea solution over and above that capable of being suspended in solution during the cooling step. As the temperature of the urea solution being recycled to the temperature adjustment tank 1 is below that necessary to keep the urea crystals from forming prematurely in more concentrated urea solutions, heat must be added to the system, preferably by means of steam coils as shown in the drawing.

As is sometimes the case, no recycle urea solution is delivered to the holding tank 1 since it may be desired to crystallize out only a minor portion of the urea present in feed solution 11. The remainder of the solution after the crystal urea is removed by some filtering means is directly delivered to an evaporator where the urea solution is further concentrated to 90% urea, or greater; thereafter the concentrated urea is prilled in any conventional manner. In these instances where no recycle urea is delivered to the tank 1, steam is delivered through the line 12 in sufficient quantity as will balance the heat loss through vessel and pipe walls.

The next step as pointed out above is one of the more important features of this invention. This is the use of a scraped surface cooler to induce crystallization of the urea. Herein by control of the temperature within the cooler, with respect to the concentration of urea in solution and the amount of urea that is to be crystallized, the operation almost instantly crystallizes out practically all the desired quantity of urea. It is extremely important that the urea solution passing through the chiller be maintained at a high velocity to effect high heat transfer and minimize crystal growth. It has also been found that a minimum of biuret is occluded in the crystal bodies when said crystals are kept microscopic in size as they are formed in the cooling device. Before any substantial amount of growth takes place within the cooler, scraper blades remove these crystals from the walls of the cooler and said crystals are quickly removed by the flow of solution through the cooler. It has been found that according to the design of the cooler and the pumps for pumping solution, only a certain maximum amount of urea can be crystallized out. In the apparatus employed in the practice of this invention in the two instances set forth below, the characteristics were such that a maximum of 17% and 27% urea crystals could be maintained as a maximum slurry. It has been found that in no event should the amount of urea crystal formed exceed 27% of the total weight of urea solution being delivered to the Votator through the line 16. When the yield of urea crystals from the slurry was less than these maximum figures for any one type of cooler, a recycle of solution from the crystal separator 4 through line 14 was not required. The total solution coming from the crystal separator was sent directly to an evaporator. When a greater yield of urea crystals is required over the maximum amount of urea crystals that can be maintained in a slurry, recycle of urea solution from the centrifuge will be required to make up the difference in yield. This operation will be more clearly illustrated in the Tables I and II which show respectively the conditions of temperatures and concentrations when the maximum amount of slurry that can be maintained in suspension would be either 17% or 27%.

TABLE I

[Feed: 100# of solution containing 82.5% urea and 17.5% water—@ 212° F.]

| From Feed, percent Yield | Pounds of Urea Crystal | Percent by Weight Slurry | Recycle | | Mother Liquor, percent Urea | Crystallization Temp., ° F. | Temp. of Solution to Cooler, ° F. |
|---|---|---|---|---|---|---|---|
| | | | Urea | Water | | | |
| 10 | 8.25 | 8.25 | 0 | 0 | 80.8 | 183 | 212 |
| 20 | 16.50 | 16.50 | 0 | 0 | 79 | 176 | 212 |
| 30 | 24.75 | 17 | 35.4 | 10.6 | 76.8 | 167 | 198 |
| 40 | 33.00 | 17 | 69.4 | 24.6 | 73.8 | 152.6 | 186 |
| 50 | 41.25 | 17 | 100.5 | 42.5 | 70 | 138 | 168 |
| 60 | 49.50 | 17 | 125 | 66 | 65.3 | 115 | 148 |
| 70 | 57.75 | 17 | 140 | 99 | 58.5 | 92 | 128 |
| 80 | 66.00 | 17 | 140 | 148 | 48.5 | 60 | 99.5 |

TABLE II

[Feed: 100# of solution containing 85% urea and 15% Water—@ 212° F.]

| From Feed, percent Yield | Pounds of Urea Crystal | Percent by Weight Slurry | Recycle | | Mother Liquor, percent Urea | Crystallization Temp., ° F. | Temp. of Solution to Cooler, ° F. |
|---|---|---|---|---|---|---|---|
| | | | Urea | Water | | | |
| 10 | 8.5 | 8.5 | 0 | 0 | 83.5 | 190 | 212 |
| 20 | 17.0 | 17.0 | 0 | 0 | 82 | 183 | 212 |
| 30 | 25.5 | 25.5 | 0 | 0 | 80 | 176 | 212 |
| 40 | 34.0 | 27 | 20.0 | 6 | 77.3 | 162 | 202 |
| 50 | 42.5 | 27 | 42.2 | 14.8 | 74 | 150 | 190 |
| 60 | 51.0 | 27 | 61.8 | 27.2 | 69.3 | 132 | 174 |
| 70 | 59.5 | 27 | 75.7 | 44.3 | 63 | 109 | 156 |
| 80 | 68.0 | 27 | 80.5 | 71.5 | 53.1 | 72 | 132 |

The urea feed solution which is to be treated by the present method may be derived from any source, but for the examples in the above tables solutions will be derived from the urea synthesis practiced according to the process described in Chemical Engineering Progress, vol. 50, No. 7, July 1954, pages 327–331. The process primarily referred to is illustrated in FIG. 7, page 329. The solution thus obtained is well suited as a feed for the process of this invention since the concentration of urea is high and the biuret content is generally about 0.3%. The final product from the dryer 8 when crystallized according to this invention has a reduced biuret content of about 0.04%. The temperature of the feed solution in the temperature adjustment vessel 1 when there is no recycle of solution is maintained within the range of about 200°–212° F. On recycle of the dilute solution returning from the crystal separator 4 the temperature of the solution in tank 1 will be lowered and need not be raised to the 200° F.–212° F. temperature because the crystallization temperature falls as the solution becomes more dilute, as illustrated in the tables. Generally, it is contemplated that the broad temperature range for the concentrated urea solution can be between 150° F. and the boiling point of the solution.

Greater and greater yields of urea crystals can be obtained by decreasing the temperature in the cooler 2, but as the temperature decreased to a certain point, such as 120° F., the temperature approaches the temperatures of cooling waters which are obtained by normal operation of a cooling tower. While it has been pointed out above that the temperature differential between cooling water and the crystallization temperature decreases until the efficiency of the process has so diminished that no further lowering can be contemplated, further cooling could be accomplished using a refrigerant.

Even though it has been indicated that the urea solution can be cooled to 120° F. or below, it has been found that the temperature of the cooled urea solution should not drop below that temperature which would produce solid urea in excess of 50% by weight of the urea in the feed solution. Generally the preferred temperature range for the cooling operation would be in the range of about 135° F. to about 185° F.

The slurry which leaves the cooler is made up of urea solution plus a mass of finely divided urea crystals. If this mass of crystals could be readily filtered or removed from solution there would be no further need of the holding tank 3. However, the crystals are so finely divided that too many would penetrate the filter media, either to clog the filter media or pass through with the filtrate. The prime reason for using the holding tank is to permit the finely divided crystals to grow. Since the solution is maintained at a constant temperature by means of a coil 39, very little additional crystallization of urea takes place in this tank. Here the larger of the urea crystals in the slurry grow at the expense of the smaller crystals which re-dissolve and thereafter recrystallize on other urea crystals which act as nuclei. It has also been found that very little biuret is occluded in the urea crystals during this period of slow growth in the holding tank.

The figure shows a recycle from the bottom of tank 3 back to the upper portion. However, this particular recycle serves no further function than to apportion the proper amount of slurry being fed to the crystal separator 4. The remainder of the slurry then re-enters the tank.

The slurry of urea crystals pumped to the crystal separator are thereupon treated in such a manner as to quickly separate the crystals from the mother liquor. Any effective filtration apparatus could be used, but it is preferred that the crystals be separated by centrifugal means. The centrifuge rapidly removes moisture from the crystals both during removal of urea solution and also during a rinsing operation. The rinsing can be done with a small portion of clear water which may flow to the evaporator with the remainder of the urea solution, or may be discharged from the process, whichever of course is desirable. A further reason for the use of the centrifuge is that it can be readily cleaned of solid urea after the centrifuge screen becomes clogged, by merely applying a steam rinse which dissolves the urea, thereby clearing the screen for further operations.

By operating the crystallizing process according to this invention it has been found that when urea solutions contain even up to 2% biuret, or even higher, a urea crystal product can be obtained that does not contain over 0.04% biuret.

The urea crystals which are removed from the centrifuge contain about 1–2% moisture which must be driven off prior to storage of the urea crystals. This drying is most effectively accomplished by passing steam heated air through a drying kiln such as illustrated in the figure. While the preferred means of drying is that illustrated in the figure, any other suitable means or methods which effectively remove the final moisture content down to about 0.2% can be used. The chief reason for applying the steam heated air is that the temperature of the air can be more readily controlled, so that excessive temperatures do not occur within the kiln. Any momentary increase in temperature will unduly decompose the urea to increase the biuret content and thus negate the advantages derived by the present method of crystallization.

*Example I*

In the operation of the improved process according to this invention a recycle solution containing 77.3% urea was added to the feed solution containing 85% urea, 14.65% water and 0.35% biuret at the rate of 26 pounds of recycle solution for each 100 pounds of feed solution. The mixture which had the temperature adjusted to 212° F. during mixing was quickly lowered to a temperature of about 162° F. as the solution was being pumped through a Votator. Urea crystallized from the solution onto a cooled surface of the Votator was scraped from the surface and re-mixed with the mother liquor to form a slurry containing 27% by weight of crystal urea. The 34 pounds of crystal urea produced represented a yield of 40% based on the feed urea solution. Since the thus formed urea crystals were only microscopic in size they were delivered to a stirred tank where the slurry of crystals and urea solution was held therein for a period of 1½ hours at 162° F. After this period of time for growth, the crystals were pumped to a centrifuge where the crystals were rapidly separated from the mother liquor. After slight wash with clear water, the centrifuged crystals were dried for ½ hour at 215° F. while a current of air passed over the crystals. After drying, a sample was taken which analyzed 0.04% of biuret. Another sample from the same operations was taken and the dried crystals were given a sieve analysis. The result obtained was as follows:

| Mesh size: | Percent retained |
| --- | --- |
| +20 | 1.6 |
| +40 | 7.0 |
| +60 | 30.4 |
| +80 | 28.1 |
| +100 | 22.8 |
| +150 | 6.8 |
| Thru 150 | 3.3 |

*Example II*

In a run employing apparatus which would permit a 17% solid slurry, a recycle solution was mixed with the original urea solution in amounts to permit a 40% yield from the feed solution. The feed solution 11 contained:

| | Percent |
| --- | --- |
| Urea | 82.5 |
| Water | 17.1 |
| Biuret | 0.4 |

A weight ratio of recycle mother liquor to feed solution was maintained at 0.94:1 and a temperature of 186° F. was established. For this mixture the temperature of solution in the Votator was maintained at 152.6° F. After formation of the microscopic crystals, the crystals were scraped from the surface of the Votator and sent to holding tank where the crystals were maintained as a slurry for two (2) hours. After a quick rinse using clear water the crystals were dried by being agitated in the presence of air at a temperature of 215° F. The resulting product had a biuret content of 0.024%. The screen analysis of the dried product was as follows:

| Mesh size: | Percent retained |
| --- | --- |
| +20 | 0.5 |
| +40 | 6.5 |
| +60 | 32.0 |
| +80 | 29.2 |
| +100 | 21.7 |
| +150 | 7.0 |
| Thru 150 | 3.1 |

This application is continuation-in-part of application Serial No. 736,493, filed May 20, 1958, and now abandoned.

What I claim is:

1. The method of recovering urea crystals having a low biuret content from a hot concentrated urea feed solution derived from the reaction between carbon dioxide and ammonia at high temperatures and pressures, which comprises adjusting the temperature of the hot urea solution to a temperature above the crystallization temperature of the urea in said solution; thereafter passing the urea solution to a subsequent cooling step where said solution is quickly cooled within one second to a temperature such that up to about 27% of the urea in the solution will crystallize, then passing the cooled solution now containing small crystals of urea to a holding tank where the solution is held for ½ to 2 hours to allow the crystals to grow to a maximum size such that not more than 2% are held on a 20 mesh screen, quickly separating the urea crystals from the mother liquor, and drying said crystals; thereby recovering a final urea crystal product characterized by the fact that said product contains not more than 0.04% biuret.

2. The method of claim 1 in which a portion of the mother liquor after separation of urea crystals is recycled back to the temperature adjusting step, the amount of said mother liquor portion not exceeding that required to produce a 50% yield of urea crystal from the urea feed solution.

3. A method of producing urea crystals essentially free of biuret from concentrated urea solutions having high biuret content which comprises regulating the temperature of said solution to temperatures from about 200° F. up to the boiling temperature of the concentrated urea solution, quickly cooling said solution within one second to a temperature within the range of 135° F.–185° F. whereby up to about 27% of the urea in said solution is crystallized, thereby producing fine crystals of urea, delivering the urea solution plus fine urea crystals to a holding tank where said solution and crystals are allowed to remain for a period of ½ to 2 hours to permit said urea crystals to grow to a maximum size such that no more than 2% of said crystals are held on a 20 mesh screen, thereafter separating the crystals from the solution and drying said crystals, thereby recoving a final urea crystal product characterized by the fact that said product does not contain over 0.04% biuret.

4. The method according to claim 3 in which a portion of the mother liquor after separation of urea crystals is recycled to the temperature adjusting step to be mixed with the urea feed solution, said mother liquor being recycled in amount such that the final yield of biuret-free crystal does not exceed 50%, said temperature adjustment step being in the temperature range of from about 150° F. to the boiling point of said mixture of recycle mother liquor and urea feed solution.

No references cited.